United States Patent [19]

van der Lely

[11] 4,449,960

[45] May 22, 1984

[54] TORQUE CONVERTER

[76] Inventor: Cornelis van der Lely, 7, Brüschenrain, ZUG, Switzerland

[21] Appl. No.: 201,367

[22] Filed: Oct. 27, 1980

Related U.S. Application Data

[62] Division of Ser. No. 969,703, Dec. 15, 1978.

[51] Int. Cl.³ .................. F16G 51/80; F16G 13/02
[52] U.S. Cl. .................................................. 474/242
[58] Field of Search ............... 474/242, 201, 28, 214, 474/215

[56] References Cited

U.S. PATENT DOCUMENTS

| | | | |
|---|---|---|---|
| 953,428 | 3/1910 | Morse | 474/229 |
| 1,692,799 | 11/1928 | Sturtevant | 474/215 |
| 3,016,755 | 1/1962 | Dittrich | 474/242 X |
| 3,049,933 | 8/1962 | Besel | 474/242 X |
| 3,089,346 | 5/1963 | Dittrich et al. | 474/242 |
| 3,596,528 | 8/1971 | Dittrich et al. | 474/28 X |
| 3,600,960 | 8/1971 | Karig et al. | 474/28 X |
| 3,600,961 | 8/1971 | Rattunde et al. | 474/28 X |
| 3,916,709 | 11/1975 | Steuer et al. | 474/242 |
| 4,125,037 | 11/1978 | Palmer et al. | 474/28 X |
| 4,186,617 | 2/1980 | Auramidis et al. | 474/229 |

*Primary Examiner*—Lawrence J. Staab
*Assistant Examiner*—Michael D. Bednarek
*Attorney, Agent, or Firm*—Penrose Lucas Albright

[57] ABSTRACT

A torque converter comprises an input member and an output member that can be interconnected by a planetary gear arrangement. A planet carrier of the planetary gear arrangement can be driven by the input member and a sun wheel of the planetary gear arrangement can also be driven by the input member, but through an infinitely variable change-speed mechanism which includes an adjustable pulley chain-drive mechanism using a chain. A preferred construction for the chain includes links pivoted to one another by members that bear on one another with convex surfaces. The end faces of the link members are enlarged and substantially flat to engage the flanges of the adjustable pulley.

28 Claims, 11 Drawing Figures

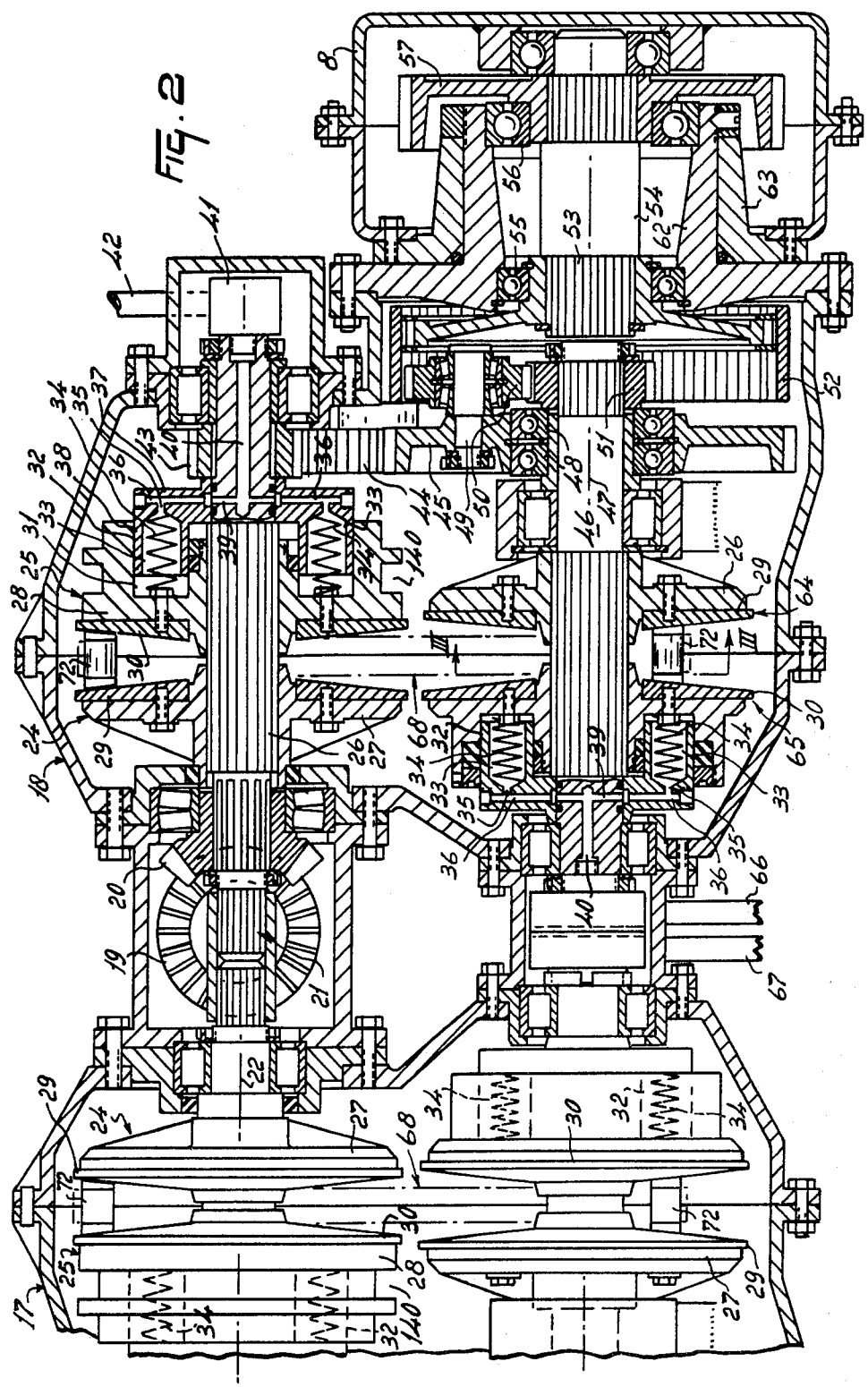

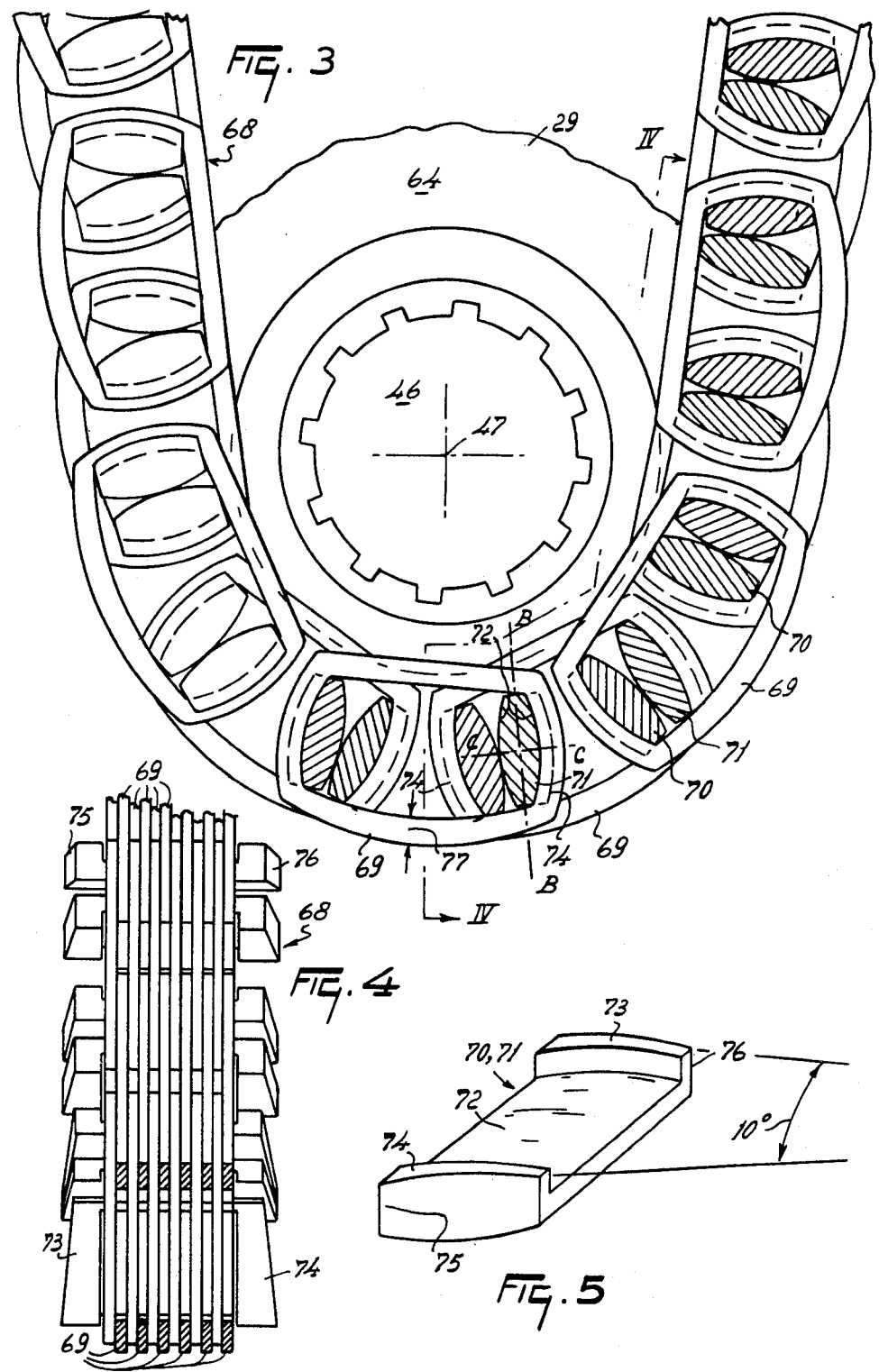

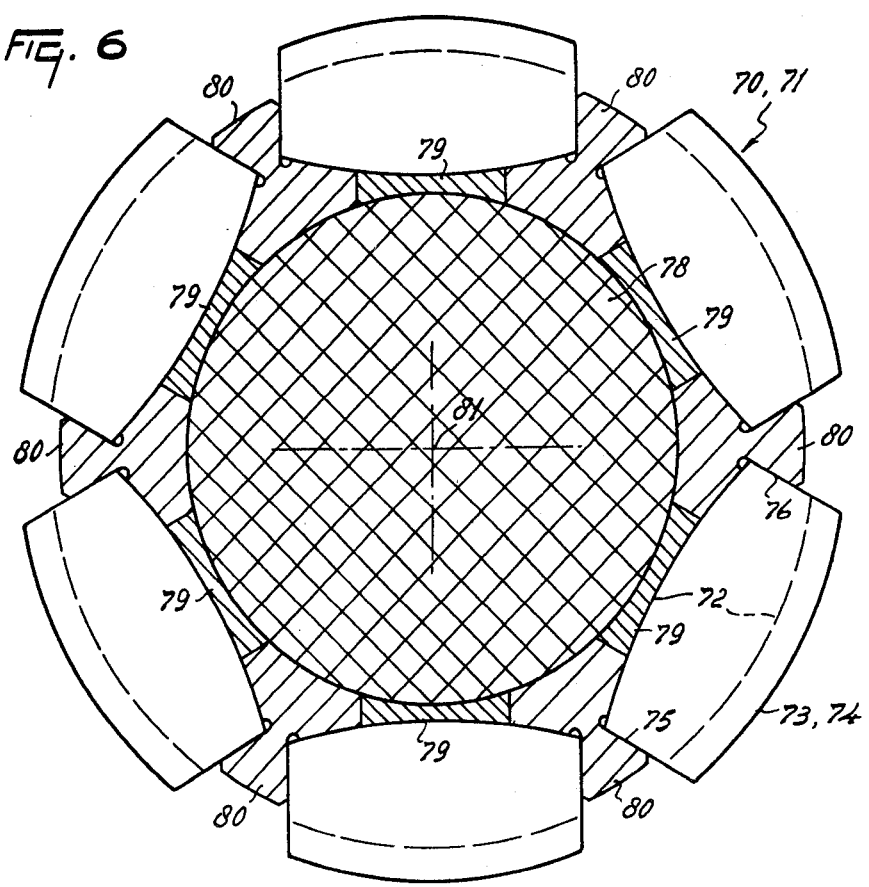

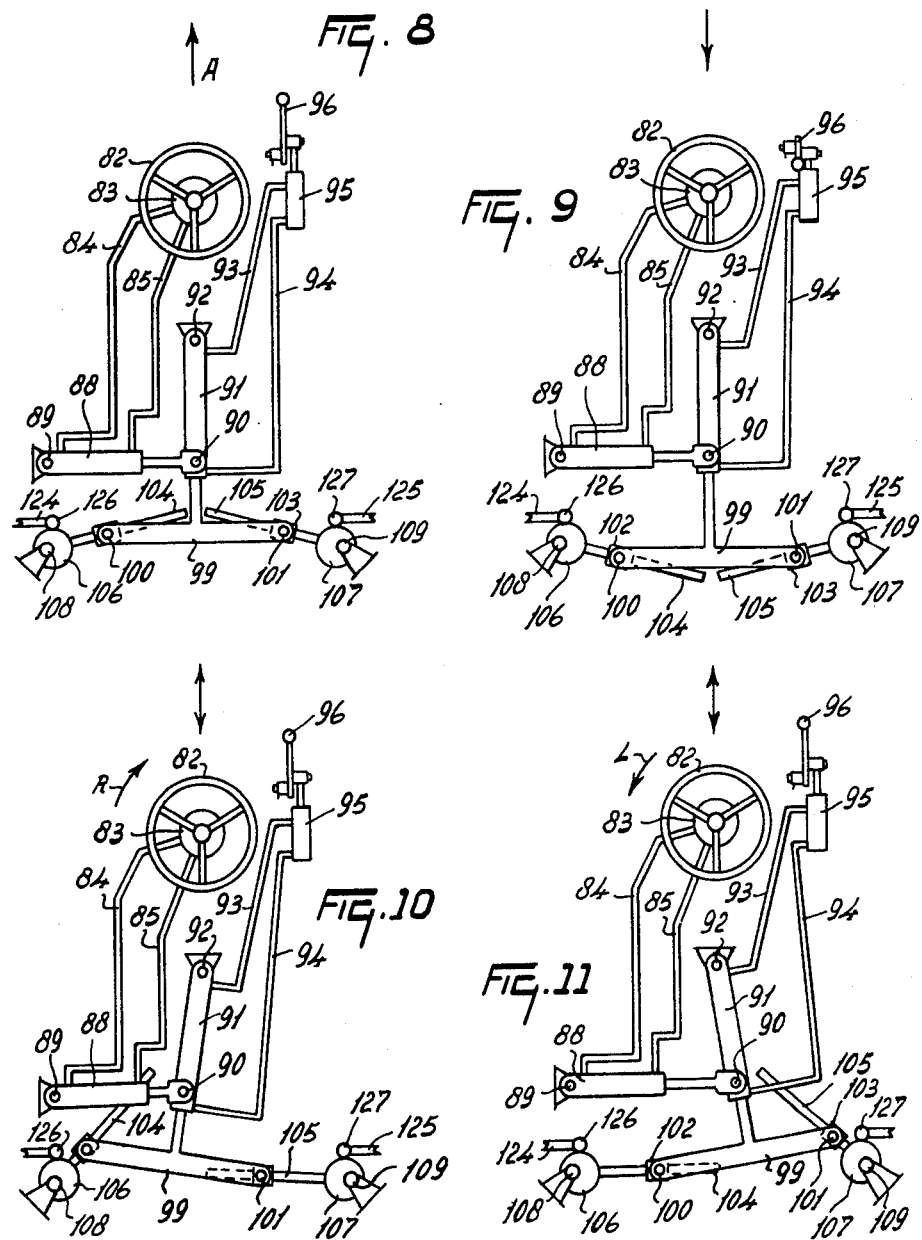

TORQUE CONVERTER

This is a division of application Ser. No. 969,703, filed Dec. 15, 1978.

SUMMARY OF THE INVENTION

According to a first aspect of the present invention there is provided a torque converter comprising an input member, a planetary gear arrangement and an output member, the input member being connected to drive a change-speed mechanism and a planet carrier of the planetary gear arrangement, an output of the change-speed mechanism being connected to drive a sun wheel of the planetary gear arrangement, whereby for a single speed of the input member the speed of the output member is infinitely variable between first and second velocities.

According to a second aspect of the present invention there is provided a torque converter comprising a change-speed mechanism including a chain pulley comprising a pair of adjustable flanges, the flanges being hydraulically displaceable relative to one another, there being no load-dependent clamping means.

According to a third aspect of the present invention there is provided a motor vehicle having on each side at least one driven axle, the two axles each being driven by a mechanical change-speed mechanism.

According to a fourth aspect of the present invention there is provided a motor vehicle comprising on each side at least one driven axle and comprising a steering arrangement which controls the adjustment of one or more steerable wheels and the speed of two driven axles propelling the tractor in a forward or a backward direction.

For a better understanding of the invention and to show how it may be carried into effect, reference will now be made, by way of example only, to the accompanying drawings, in which:

BRIEF DESCRIPTION OF THE DRAWINGS

FIG. 2 is a vertical sectional view of two torque converters of the tractor shown in FIG. 1, FIG. 3 is a partially sectioned elevational view taken in the direction of the arrows III—III in FIG. 2;

FIG. 4 is a partially sectioned elevational view taken in the direction of the arrows IV—IV in FIG. 3;

FIG. 5 is a perspective view of part of the driving chain of FIGS. 3 and 4;

FIG. 6 is a schematic sectional view of a holding device for the part of the driving chain shown in FIG. 5;

FIGS. 8 to 11 illustrate schematically different positions of parts of the control layout of FIG. 7.

DESCRIPTION OF THE PREFERRED EMBODIMENTS

Figure 1:
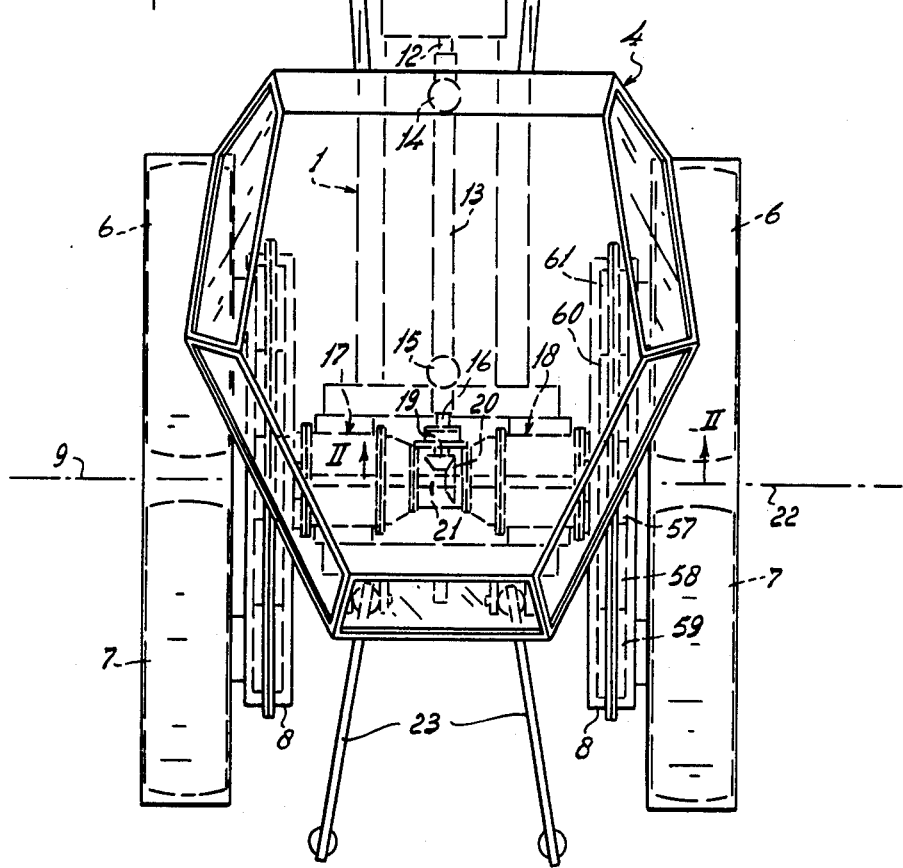
FIG. 1 is a plan view of a tractor.

By way of example, the present invention will be described as applied to the tractor shown in FIG. 1, which comprises a frame 1 supported near the front by one or more (two in the illustrated embodiment) front wheels 2, which are steerable about upwardly extending king pins 5 by means of track rods 3 controlled from a driver's cabin 4. Near the rear, the tractor frame 1 is supported by two pairs of rear wheels 6 and 7. A leading rear wheel 6 and a trailing rear wheel 7 is provided on each side of the tractor one behind the other, with respect to the normal direction of operative travel A. Around each set of rear wheels 6, 7 on each side of the tractor runs a caterpillar track, which can be driven by either one or both of the two wheels 6, 7 of each set. The leading rear wheel 6 and the trailing rear wheel 7 on each side of the tractor are fastened to a wheel carrier 8, which accommodates part of the drive of one or both wheels 6, 7. Each wheel carrier 8 together with its wheels 6 and 7 is freely pivotable relatively to the tractor frame 1 about a horizontal axis 9, which extends transversely of the direction A. The wheels 6 and 7 on each side of the tractor thus operate in tandem.

Near the front of the frame 1 there is a driving engine 10, which would normally be a Diesel engine. It is fastened to the frame 1 and has an output shaft 12, which can be coupled to the engine by a driver-controlled clutch 11. The shaft 12 is coupled by an intermediate shaft 13 and two universal joints 14 and 15 with an input shaft 16 of a torque converter which, in this embodiment, is a double torque converter 17, 18. The input shaft 16 carries a bevel gear wheel 19 (FIGS. 1 and 2), which meshes with a further bevel gear wheel 20. The gear wheel 20 has the same dimensions as the gear wheel 19 and is fastened to a main shaft 21 of the torque converters 17, 18. This shaft 21 extends substantially horizontally and transversely of the direction A and also transversely of the output shaft 12, the intermediate shaft 13 and the input shaft 16. The centerline 22 of the main shaft 21 extends parallel to and perpendicularly above the centerline of the pivotal axis 9. The rear wheels 6 and 7 are driven, in a manner which will be described more fully later in this description, through the torque converters 17 and 18. The tractor has a lifting device 23 at the rear.

The two torque converters 17 and 18 are identical and are disposed symmetrically one on each side of the vertical plane of symmetry of the tractor, which contains the centerline of the input shaft 16; only the torque converter 18 will be described.

The gear wheel 20 drives the main shaft 21, which carries an adjustable pulley comprising flanges 24 and 25. The pulley is part of an infinitely variable change-speed mechanism and is co-axial with the centerline 22. The two flanges 24 and 25 are fastened rotationally to the shaft 21 by means of axial splines 26, the flange 24 being also rigidly secured to the main shaft 21 against axial movement. The flange 25, however, is slidable in an axial direction along the main shaft 21 towards and away from the flange 24. Each flange 24 and 25 comprises a plate 27 and 28 respectively, and linings 29 and 30 are fastened to the facing sides of the plates 27 and 28 respectively. The linings 29 and 30 are made from hard and ground material and have conical facing surfaces. The cones have a common axis which coincides with the centerline 22, and the cone angles are about 170°. The conical surfaces are disposed so that their vertices face one another, as shown in FIG. 2. The angle between the facing surfaces of the linings 29 and 30 is about 10°.

The plate 28 of the flange 25 has in this embodiment four cylindrical recesses 31 on the side of the disc 25 away from the lining 30. The centerline of the cylindrical recesses 31 are parallel to and spaced from the centerline 22. Each recess 31 contains an axially movable plunger 32, which has a cylindrical recess 33 which is co-axial with the corresponding recess 31. The recesses 31 and 33 house a helical compression spring 34, which engages the ends of the recesses 31 and 33. The end of each recess 33 away from the plate 28 of the flange 25 has an axial bore 35, which opens into a radial bore 36 in a supporting part 37 of an annular housing 38, in which the recesses 33 are provided. The annular housing 38, together with its supporting part 37, is axially fixed with respect to the main shaft 21. The bores 36 in the supporting part 37 communicate with a radial bore 39 in the shaft 21 and with an axial bore 40 in the shaft 21, which is co-axial with the centerline 22. At the end of the shaft 21 away from the gear wheel 20 the bore 40 opens into a coupling piece 41, which remains stationary with respect to the housing of the torque converter when the shaft 21 rotates, while maintaining a fluid-tight seal. The bore 40 communicates through the coupling piece 41 with a conduit 42; the further connection of the conduit 42 will be described more fully later in this description.

At the end of the supporting part 37 away from the flange 25 there is a gear wheel 43 which is rigidly secured to the shaft 21 by means of axial splines. In this embodiment the gear wheel 43 has 19 straight teeth. The gear wheel 43, which is co-axial with the centerline 22, meshes with an intermediate gear wheel 44 which is freely rotatable on a spigot shaft extending parallel to the centerline 22. The intermediate gear wheel 44 meshes with straight teeth on the periphery of a planet carrier 45 which is supported on a lay shaft 46 by means of bearings 48 which allow the planet carrier 45 to rotate with respect to the lay shaft 46. The planet carrier 45 is co-axial with the centerline 47 of the lay shaft 46. In the present embodiment, the planet carrier has 76 straight teeth. The planet carrier 45 has five shafts 49, the centerlines of which are parallel to the centerline 47 and 22. Each of the shafts 49 carries a freely rotatable planet wheel 50, each of which has 30 straight teeth. The five planet wheels 50 all mesh with a sun wheel 51, which is co-axial with the centerline 47 and is rigidly secured to the lay shaft 46 by means of axial splines. The sun wheel 51 of this embodiment has 30 straight teeth.

The five planet wheels 50 also mesh with an internally toothed annulus 52, which surrounds the planet wheels. The annulus 52 is rigidly secured by axial splines 53 to an output shaft 54 which is co-axial with the lay shaft 46; the shaft 54 is, however, freely rotatable with respect to the lay shaft 46 on bearings 55 and 56. On the side away from the annulus 52, the output shaft 54 projects into the wheel carrier 8 and there carries a gear wheel 57. The gear wheel 57 is rigidly connected to the shaft 54. With respect to the direction A, there is a gear wheel 58 (see FIG. 1) disposed behind the gear wheel 57. This gear wheel 58 meshes with the gear wheel 57 and with a gear wheel 59 disposed behind it. The gear wheel 59 is connected to a shaft which projects from the carrier 8 and is rigidly secured to the trailing rear wheel 7. The gear wheel 57 also meshes with a gear wheel 60 disposed in front of it. In front of the gear wheel 60 is a gear wheel 61 which meshes with the gear wheel 60. The gear wheel 61 is connected to an output shaft which is rigidly secured to the leading rear wheel 6. The gear wheels 57 to 61 are all journalled in the wheel carrier 8.

To the housing of the two torque converters 17 and 18 is rigidly secured on each side a cylindrical supporting bushing 62, the cylindrical outer surface of which is co-axial with the lay shaft 46. The centerline 47 coincides with the centerline 9, about which the tandem sets 6, 7 are freely pivotable. At the area of the gear wheel 57 each wheel carrier 8 is provided with a suporting bushing 63, whose cylindrical inner surface is co-axial with the centerline 47 and closely fits around the cylindrical outer surface of the supporting bushing 62 so that the wheel carrier 8, together with the rear wheels, is freely pivotable with respect to the housing of the torque converters 17, 18 by means of the interengaging supporting bushings 62 and 63.

On the side of the bearing 48 away from the shaft 54 there is another pulley, comprising flanges 64, 65. This pulley is co-axial with the lay shaft 46, the flanges being located directly beneath the corresponding flanges 24 and 25. The construction of the pair of flanges 64, 65 is identical to that of the flanges 24, 25, the structure of the flange 64 corresponding with that of the flange 24, while the structure of the flange 65, which is slidable with respect to the shaft 46, is the same as that of the flange 25. For the sake of simplicity the parts of the flanges 64 and 65 corresponding with those of the flanges 24 and 25 are designated by the same corresponding reference numerals. The supply and drainage of hydraulic fluid intended for the flange 65 takes place through a conduit 66, and a conduit 67 serves the same purpose for the corresponding flange of the torque converter 17. In FIG. 2, parts associated with the torque converter 17 are designated by same reference numerals as the corresponding parts of the torque converter 18. The housing of the torque converters 17 and 18 is secured in a manner not shown to the frame 1 of the tractor shown in FIG. 1.

The two pairs of flanges 24 and 25 on main shaft 21 and 64 and, 65 on lay shaft 46 are intercoupled by means of a driving chain 68 by which the flanges 64 and 65 and hence lay shaft 46 can be driven when the driving engine 10 drives the flanges 24 and 25.

The chain 68 is shown more fully in FIGS. 3, 4 and 5. It comprises a great number of groups of links 69, in which adjacent groups of links are intercoupled by pairs of link members 70, 71. The members 70, 71 of each pair are forced against one another by tensile force applied to the chain. Each group of links 69 comprises, in the illustrated embodiment, six parallel links 69 extending perpendicular to the centerline 47. The end portions of the links 69 of one group are intercalated with the end portions of the links 69 of an adjacent group. The end portions of the links of the two groups provide an opening in which there is a pair of link members 70, 71.

From the sectional view of each link member 70, 71 (see the right-hand half of FIG. 3) it will be seen that the portion of each link member in the opening defined by the links has an elongate cross-sectional shape which is symmetrical about each of the orthogonal axes B—B and C—C shown in FIG. 3. This cross-sectional shape of each link member is bounded by arcs 72 of a circle and by edge faces which are parallel to the axis C—C and interconnect the ends of the arcs 72. The axis B—B, when the chain is straight, is approximately perpendicular to the length of the chain. The length of the cross-sectional area of each link member, measured parallel to the axis B—B, is larger than the width of this area measured parallel to the axis C—C; in the illustrated embodiment, it is about two and one-half times larger. One of the boundary surfaces 72 of each link member engages over the whole of its length with the inner surfaces of the links 69 of one of the groups, the other boundary surface 72 of the same link member being in contact with the corresponding boundary surface 72 of the other link member of the same pair. This contact between the two link members takes place along a common generatrix of the two boundary surfaces 72, which extends parallel to the centerline 47 or 22. Each link member 70, 71 has two lugs 73 and 74 (FIG. 5) at the ends of the boundary surface 72 which is in contact with the inner side of the links 69. These lugs 73 and 74 overlap the outer sides of the outermost links 69 of each group. The lateral surfaces of the end portions of the links 69, apart from the two outermost links, are in direct contact with the lateral surfaces of the links of the adjacent group.

Each link member 70, 71 is bounded by end faces 75 and 76 (FIGS. 4 and 5) which contact under pressure the facing conical surfaces of the linings 29 and 30 of the pairs of flanges 24, 25 and 64, 65 respectively.

From FIG. 3 it will be understood that each link 69 surrounds three or more link members, while the dimensions are preferably such that the smallest distance between two non-contacting link members, as shown in the side elevation of FIG. 3, is equal to or larger than the dimension of a boundary surface 75 or 76 measured in the same direction, since the lugs 73 and 74 project beyond one of the boundary surfaces 72. The dimensions are, of course, such that in the area of the greatest curvature of the chain 68 (lower side of FIG. 3) the lugs 73, 74 facing one another do not contact one another.

As shown in the elevational view of FIG. 3, each link 69 has a substantially rectangular shape, the shorter sides and one of the longer sides being slightly curved, while the rim of each link in this elevational view is narrow compared with the opening enclosed by it. The largest dimension of the opening is preferably at least ten times the width of this rim, which is designated by reference numeral 77 in the elevational view of FIG. 3.

All of the link members 70, 71 are made from hardened ball bearing steel and all of the links 69 are made from hardened spring steel.

During manufacture the link members 70, 71 are machined in sets in a milling and grinding jig as shown in FIG. 6. The link members are clamped for this purpose in a holding device comprising a cylindrical six-pole magnet 78, the cylindrical outer surface of which is provided with six cylindrical soft-iron cores 79 evenly distributed around the circumference of the magnet 78 and having their axes extending radially. Placed between each pair of adjacent cores 79, is an adapting piece 80.

The shape of the outer surfaces of the soft-iron cores 79 and of the adapting pieces 80 is such that a set of six link members can be disposed as is illustrated in FIG. 6. For this purpose two adapting pieces 80 located at the sides of a core 79 have a recess such that the end faces 75, 76 and one of the boundary surfaces 72 of the link member are seated against the adapting pieces 80 and against the surface of the core 79. The link members are put in the clamping device in the unmachined state, where they are clamped by magnetic force passed through the cores 79 and are held in place by the design of the recesses in the adapting pieces 80 and of the outer surfaces of the magnet cores 79. The whole clamping device, together with the link members arranged on it, is fixed on a milling or grinding machine so that the centerline of the spindle of the machine coincides with the centerline 81 of the cylindrical magnet 78. When the clamping device is rotated the outer boundary surfaces 72 of the link pins can be subjected together to a milling or grinding operation. The lugs 73 and 74 of each link pin are located just beyond the two end faces of the adapting pieces 80 extending perpendicular to the centerline 81. After this machining the link members are turned over so that the lugs 73 and 74 project inwardly towards the centerline 81 as a result of which the other boundary surface 72 of each link member can be finished. The adapting pieces 80 are designed so that the end faces 75 and 76 of each link pin, which converge at an angle of 10°, can be fitted near the end faces of the adapting pieces 80.

Figure 7:
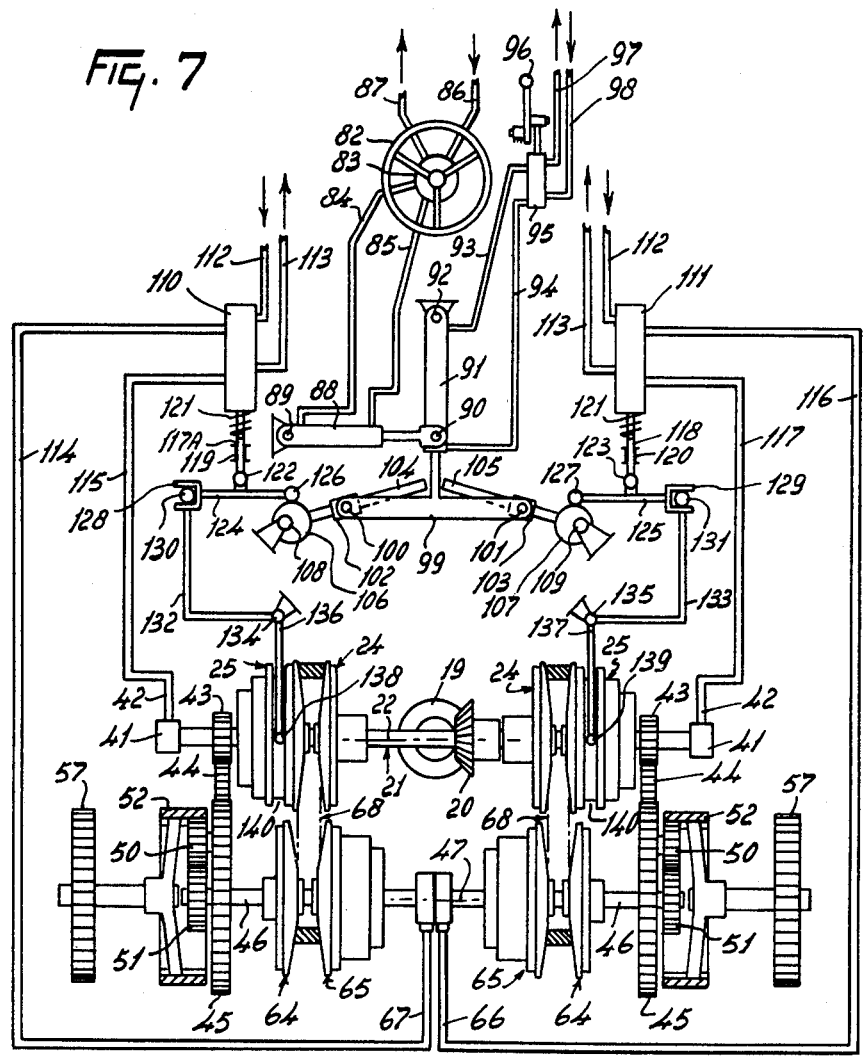
FIG. 7 is a simplified diagram of a control layout of a tractor.

In order to allow the performance of various movements of the tractor shown in FIG. 1, such as turns to the right or left in conjunction with forward or backward travel, a control system is provided, the layout of which is represented schematically in FIG. 7.

Near the driver's seat in the cabin 4 of the tractor is a steering wheel 82 having a steering shaft which is coupled with a hydraulic steering device 83. This device 83 is constructed such that, in dependence upon the direction of rotation of the steering wheel 82, pressurized hydraulic fluid is conducted through one of two conduits 84, 85 communicating with the steering device 83 away from the steering device and non-pressurized fluid is fed to the steering device 83. The steering device 83 is connected through conduits 86 and 87 with a hydraulic fluid pump driven by the engine 10 and communicating with a fluid reservoir.

The conduits 84 and 85 communicate with a double-acting hydraulic cylinder and piston unit 88, the cylinder of which is connected at one end to the tractor frame for pivotal movement about a pivotal shaft 89. The piston rod of the unit 88 is pivotally connected by a pivotal shaft 90 to that end of a cylinder of a double-acting hydraulic cylinder and piston unit 91 from which the piston rod projects. The other end of the cylinder of the unit 91 is pivotally connected to the tractor frame 1 by means of a pivotal shaft 92. The pivotal shafts 89, 90 and 92 are parallel to one another. In the central position illustrated in FIG. 7 the centerline of the units 88 and 91 are perpendicular to one another. The unit 91 communicates with a control slide 95 through conduits 93 and 94 opening one on each side of the piston of the unit 91. The control slide 95 is adjustable by means of a lever 96 disposed near the driver's seat. The control slide 95 communicates through conduits 97 and 98 with the fluid pump and the fluid reservoir.

The piston rod of the unit 91 is rigidly fastened to a coupling rod 99 midway along the length of the coupling rod 99. The coupling rod 99 is perpendicular to the piston rod of the unit 91. Near eahh end of the coupling rod 99 is arranged a pivotal shaft 100 or 101 respectively, and these pivotal shafts extend parallel to the pivotal shafts 89, 90 and 92. Freely pivotable around each pivotal shaft 100 and 101 is a sleeve 102 or 103 respectively. The sleeves 102 and 103 each have a bore which is perpendicular to the associated pivotal shaft 100 and 101 respectively. Through each of these bores passes a control rod 104 and 105 respectively, which is freely axially slidable with respect to the associated sleeve 102 and 103 and is freely pivotable about the associated pivotal shaft 100 and 101 with respect to the coupling rod 99. The control rods 104 and 105 are of equal length and their ends are located beyond the ends of the coupling rod 99 and are rigidly secured to the periphery of control discs 106 and 107 respectively. Each of the control discs 106 and 107 is circular and is able to turn about pivotal shafts 108 and 109 respectively which are perpendicular to the discs 106, 107.

These shafts are disposed eccentrically with respect to the circular circumference of the associated discs. In the embodiment shown in FIG. 7, which illustrates a central position, each pivotal shaft 108 and 109 respectively is located on that side of the geometrical center of the disc circumference away from the fastening area of the associated control rod 104 and 105 respectively.

The system shown in FIG. 7 comprises two symmetrically disposed control valves 110 and 111, which communicate through conduits 112 and 113 with the fluid pump and the fluid reservoir. The control valve 110 communicates through a conduit 114 with the conduit 67 and through a conduit 115 with the conduit 42 for the purpose of controlling the flange 65 of the torque converter 17. In a similar manner the control valve 111 communicates through a conduit 116 with the conduit 66 and through a conduit 117 with the conduit 42 for the purpose of controlling the torque converter 18.

The control valves 110 and 111 are provided with actuating rods 117A and 118 respectively, which project out of the housing of the associated valve 110 and 111 and which are supported by respective straight guides 119 and 120. Each actuating rod 117A and 118 is surrounded by a compression spring 121, which urges the actuating rod outwardly of the associated valve housing. The end of each actuating rod 117A and 118 away from the associated valve housing is pivotally coupled by means of a pivotal shaft 122 or 123 respectively with a lever 124 or 125 respectively. One end of each of the levers 124 and 125 is provided with a roller 126 or 127 respectively, which is pressed by the associated spring 121 into engagement with the circular outer circumference of the associated control disc 106 or 107 and can roll along that outer circumference. On the side away from the roller 126 or 127 respectively, each lever 124 and 125 is provided with a fork-like end piece 128 or 129 respectively, in which is received a roller 130 or 131 respectively. Each of these rollers is fastened to a lever 132 or 133 respectively, which can turn about a pivotal shaft 134 or 135 respectively with respect to the tractor frame. The end pieces 128 and 129, together with the associated rollers 130 and 131, constitute ball-and-socket joints which can slightly adjust themselves. The design of the levers 132 and 133 is shown in FIG. 7. An end piece 136 of the lever 132 and an end piece 137 of the lever 133 crosses the centerline 22 of the main shaft 21 approximately at right angles.

Each end piece 136 and 137 respectively is provided at the end away from the respective pivotal shaft 134 and 135 with a roller 138 or 139 respectively. Each of the rollers 138 and 139 is located in an annular groove 140 which runs co-axially around the plates 28 of the flanges 25 of the torque converters 17 and 18.

The torque converters operate under various conditions as follows. Via the clutch 11 and the intermediate shaft 13 the driving engine 10 drives the input shaft 16 of the torque converters 17 and 18. The rotation of the input shaft 19 is transmitted through the cooperating gear wheels 19 and 20 to the main shaft 21, which in this embodiment drives the two torque converters 17 and 18 simultaneously. The main shaft 21 drives the two flanges 24 and 25, which are coupled by the driving chain 68 with the two flanges 64 and 65 on the lay shaft 46. The main shaft 21 drives the planet carrier 45 through the gear wheels 43 and 44 so that the shafts 49 of the planet wheels 50 rotate about the centerline 47 of the lay shaft 46. The lay shaft 46, driven through the infinitely variable change-speed gear 24, 25, 68, 64, 65 causes the sun wheel 51 to rotate. The planetary gear wheel system comprising the sun wheel 51, the planet wheels 50 and the annulus 52, which is rigidly coupled with the output shaft 54, thus has a planet carrier 45 which rotates at a speed fixed by the speed of the output shaft of the engine 10 and a sun wheel 51 which rotates at a speed which is infinitely variable by means of the change-speed gear 24, 25, 68, 64, 65 so that the speed of the output shaft 54 and hence of the rear wheels 6 and 7 can be infinitely varied.

By using each of the two identical torque converters 17 and 18 to drive one of the two sets of rear wheels 6 and 7, different speeds can be imparted to the two sets of rear wheels 6, 7 on the two sides of the tractor by driving the sun wheel 51 of the torque converter 17 at a different speed to the sun wheel 51 of the torque converter 18 so that it is possible to cause the tractor to execute left- and right-hand turns in conjunction with the steerable front wheels 2.

Variation of the speed of the sun wheels 51 of the torque converters 17 and 18 is achieved by axially displacing the flanges 25 and 65. With the dimensions shown the transmission ratio between the pulley comprising the pair of flanges 24 and 25 and the pulley comprising the pair of flanges 64, 65 can be varied between 1:2 and 2:1. With an output speed of the driving engine, in this case the Diesel engine 10, of about 2000 RPM the main shaft 21 is also driven at this speed, since the gear wheels 19 and 20 are of the same size. From the above mentioned dimensions of the gear wheels 43 and 45 it follows that the planet wheels 50 rotate with a speed of about 500 RPM about the centerline 47. With a transmission ratio of 1:2 of the change-speed gear the sun wheel 51 is driven with a speed of about 4000 RPM. In this case the output shaft 54 rotates with a speed of about 666 RPM in a direction which corresponds to the forward speed of the tractor. If in an extreme case a transmission ratio of the change-speed gear of 2:1 is used, the sun wheel 51 rotates with a speed of 1000 RPM so that the output shaft 54 has a speed of about 333 RPM in a direction corresponding to a backward travel of the tractor. With a transmission ratio of the change-speed gear of about 1:1, the sun wheel 51 being then driven with a speed of 2000 RPM, the output shaft 54 and hence the tractor remain stationary. Since the change-speed gear is infinitely variable, all intermediate speeds of the output shaft 54 can be obtained. This adjustment of the speeds of the output shafts 54 can be made for the torque converters 17 and 18 independently of one another by independently setting the change-speed gear associated with these torque converters.

With respect to the part of this adjustment illustrated in FIG. 2 the following should be noted. When pressurized hydraulic fluid is admitted into the conduit 42, the hydraulic pressure propagates via the coupling piece 41 and the bores 40, 39, 36, 35 into the cylindrical recess 33 in the annular housing 38 and into the recess 31 of the plate 28 of the flange 25. Since the annular part 38 and the supporting part 37 are rigidly axially secured with respect to the shaft 21, the flange 25 will slide along the splines 26 towards the flange 24 so that the driving chain 68 will engage the linings 29 and 30 at a larger radius. Owing to the consequent increase in tensile force, the chain 68 will urge the flanges 54 and 65 apart from one another. The flange 64 remains in place with respect to the lay shaft 46, but the flange 65 moves axially away from the flange 64. The fluid present in the recesses 31 and 33 of the flange 65 is fed back to the fluid reservoir, since the annular housing 38 and the supporting part 37 of the disc 65 maintains their positions, through the bores 35, 36, 39 40 and the conduit 66 via an adjustable pressure limiting valve (not shown). Conversely, the flanges 64 and 65 can be moved together to bring the chain 68 to a larger diameter position by feeding pressurized hydraulic fluid through the conduit 66, the hydraulic fluid displaced by movement of the flange 25 then being conducted away through the conduit 42. The springs 34 are active at the start of the change-speed gear.

It should be emphasized that the speed of rotation of the output shaft 54 can be progressively reduced from a direction of rotation corresponding to a forward direction of travel to zero and then progressively accelerated in the opposite direction of rotation, corresponding to a backward travel, while the direction of rotation of the input shaft 16 and, in this embodiment, the speed of the driving engine remain the same, owing to a stepless variation of the speed of the sun wheel 51.

The steering of the tractor will be explained with reference to FIG. 7 and the associated FIGS. 8 to 11, which illustrate schematically different positions of the central part of the steering system. FIGS. 7 and 8 show a symmetrical state relating to a straight forward travel of the tractor. The control rods 104 and 105 are in this case at the same angle to the longitudinal direction of the coupling rod 99. The control discs 106 and 107 symmetrically occupy such a position that the actuating rods 117A and 118 are in the same positions relative to the control valves 110 and 111, in which hydraulic pressure is admitted through the conduits 115 and 117 respectively into the cylindrical recesses 31 and 33 of the torque converters 117 and 118 at the same pressure. Thus the flanges 25 of the two torque converters are symmetrically moved towards the associated flanges 24 so that the two sun wheels 51 are driven at the same comparatively high speed, which results in forward straight-ahead travel of the tractor. This position corresponds to a non-rotating steering wheel 82.

When the driver positions the lever 96 of the control disc 96 (FIGS. 7 and 9) so that hydraulic fluid is fed through the conduit 93 to the unit 91, the piston rod of this unit is extended, and the coupling rod 99 is moved away from the unit 91. The control rods 104 and 105 are symmetrically turned by means of the pivotable sleeves 102 and 103 so that the position shown in FIG. 9 is reached. Since the discs 106 and 107 turn about eccentrically arranged pivotal shafts 108 and 109 respectively, the rollers 126 and 127, engaging the outer circumferences of the discs, will follow the displacement of the outer surface so that the levers 124 and 125 turn about pivotal axes located approximately at the rollers 130 and 131 respectively. The piston rods 117A and 118 of the control valves 110 and 111 respectively thus move outwardly of the valve housings so that pressurized hydraulic fluid is fed through the conduits 114 and 116 respectively and 67, 66 respectively to the flanges 65 of the torque converters 17 and 18, while the fluid displaced by the chain 68 from the flanges 25 is conducted away through conduits 115 and 117 respectively. This extending movement of the piston rod of the unit 91 causes the speed of the sun wheels 51 to drop and can be continued until the speed of the sun wheels 51 has attained a value such that the speeds of the two output shafts 54 have both passed through zero value and have begun to rotate in the opposite direction. In this case, as before, the steering wheel 82 remains in its medium position. The rollers 138 and 139 running in the grooves 140 follow the two flanges 25, which slide symmetrically in the outward direction, as a result of which the levers 132 and 133 turn about the pivotal shafts 134 and 135 respectively and act on the end pieces 128 and 129 respectively to cause the levers 124 and 125 respectively to turn about the centerline of the rollers 126 and 127 respectively to provide a feedback effect on the actuating rods 117A and 118 of the valves 110 and 111. A symmetrical end position of the actuating rods 117A and 118 is attained in a controlled manner.

When the steering wheel 82 is turned to the right in the direction of the arrow R (FIG. 10), pressurized hydraulic fluid is fed through the conduit 85 to the unit 88, while fluid is discharged through the conduit 84 so that the unit 91 turns about the pivotal shaft 92, as is indicated in FIG. 10. When the lever 96 is in such a position that the piston rod of the unit 91, before the steering wheel 82 has been turned, has caused the control rods 104 and 105 to occupy, for example, the position shown in FIG. 7, the control rods 104 and 105 both turn to the left when the steering wheel 82 is turned. The control valve 110 thus sets the torque converter 17 in the direction corresponding to forward travel, whereas the control valve 111 sets the torque converter 18 to zero drive or even in the direction corresponding to backward travel. The position of the lever 96 together with that of the steering wheel determines the radius of the bend to be negotiated. When the control rod 104 is at the same angle to the line of connection between the pivotal shafts 100 and 101 in the direction corresponding to forward travel as the control rod 105 in the direction corresponding to backward travel, the rear wheels 6 and 7 on the left-hand side of the tractor rotate with the same speed in the forward direction as do the rear wheels 6 and 7 on the right-hand side of the tractor in the backward direction so that the tractor tends to turn about a vertical axis located in the plane of symmetry of the tractor near the centerline 22 (see FIG. 1). It will be realized that adjustment of the position of the lever 96 varies the speeds of the output shafts 54 in the forward or backward direction so that during forward or backward travel a bend can be negotiated by turning about a vertical axis located away from the plane of symmetry of the tractor.

FIG. 11 illustrates the position of the unit 91 and of the coupling rod 99, when the steering wheel is turned in the direction L, which results in a turn to the left during forward or backward travel in the same manner as the position shown in FIG. 10 results in a right turn. The chosen direction of each turn is thus the same whether the tractor is travelling forwards or backwards. The torque converters are illustrated driving only rear wheels on both sides of the tractor, but they could also be used to drive more wheel axles so that, if desired, the front wheels of a tractor may be driven in a similar manner by coupling them with the steering device 83 and with the control slide 95. It will be clear that front wheels provided with torque converters can be connected in a similar manner with the control system of FIG. 7 so that in this case all tractor wheels are controlled.

The use of the driving chain 68 shown in FIGS. 3 to 5 to transmit drive between the pairs of flanges 24, 25 and 64, 65 results in a high efficiency for each torque converter. This is because friction losses resulting from the alternating increase and decrease in the radius of curvature of the chain are kept very low. In conventional chains, the links are interconnected by pivot pins, and the links turn with respect to the pivot pins and produce friction. Each of these pins, in the illustrated chain is replaced by a pair of non-circular link members 70, 71 whose arcuate boundary surfaces 72 are in contact with one another on one side, whereas the opposite boundary surfaces 72 are in contact with the inner surfaces of the associated links. These inner surfaces matching the outer boundary surfaces 72. Upon a variation of the radius of curvature of the chain 68 the interengaging boundary surfaces 72 of the two link members 70, 71 roll over one another so that at the area of contact between the two surfaces there is no relative sliding displacement. Friction is therefore avoided. The two outermost boundary surfaces 72 of each pair of link members 70, 71 are firmly held by the inner sides of the end parts of the associated links 69 and so cannot move with respect to these end parts. During relative turning of two adjacent groups of links 69 the relative positions of each group of links 69 and of the associated link member 70 or 71 does not change. There is therefore no friction loss here either, since the relative turning occurs by the rolling movement of the engaging boundary surfaces 72 of both link members one over the other. Between the two surfaces there is only a comparatively high normal force, any tangential component being so low that the maximum friction coefficient between the two surfaces is not exceeded and no sliding occurs. Since the contact surfaces 72 of the two link members 70 and 71 are comparatively large and since substantially the whole of each contact surface 72 comes into contact, during a revolution of the chain, with the contact surface of the other link member, a long lifetime is ensured, particularly if the link pins are made from hardened ball-bearing steel.

The flange-like lugs 73 and 74 of each link member 70, 71 embrace a group of links 69 along the outer surfaces of the two outermost links of the group. Since the boundary surface 72 engaging the end portions of the group of links does not move with respect to those links, the lugs 73 and 74 are also stationary with respect to those end portions. The end surfaces 75 and 76 of each link member 70 or 71 constitute hardened, flat surfaces, each of which contacts the respective lining 29 or 30 only along a generatrix of that lining. Relative movement of the surfaces 75 or 76 with respect to the lining surface does not occur due to the high normal force so that friction losses are avoided in this region also. In this embodiment, the angle between the two end faces 75 and 76 is 10°, which corresponds accurately with the angle between the two conical surfaces of the linings 29 and 30 shown in the sectional view of FIG. 2. Thus there is linear contact between these lining surfaces and the end faces 75 and 76. Because of this linear contact such a high normal pressure is produced between the linings 29 and 30 on the one hand and on the end faces 75 and 76 on the other hand that the maximum friction coefficient between these surfaces is not exceeded. This normal pressure is determined by the hydraulic pressure in the recess 31 of the flanges 25 or 65 and by the adjusted pressure of the pressure relief valve (not shown) included in the conduits 66 or 67 and in the conduit 42 respectively or in the communicating conduits. The pressure in whichever of the flanges 65 and 25 is being moved to expel hydraulic fluid can be adjusted until the normal pressure is sufficiently high to prevent relative displacement between the end faces 75 and 76 on the one hand and the linings 29 and 30 on the other hand of the non-pressurised pair of flanges.

Owing to the high normal pressures involved, comparatively high power can be transmitted substantially without loss so that known load-dependent pressure means for urging the flanges of one pulley towards one another can be omitted thus reducing the cost of the change-speed gear. Nevertheless a high power (in this case 100 HP) can be transmitted by each torque converter.

Although the torque converters have been described in connection with an agricultural tractor, it will be understood that both a single and a double torque converter according to the invention may also be employed in other land vehicles such as motor cars, as well as in aircraft and watercraft. When only a single torque converter is used, it performs the function of a gear box or a hydrostatic variator and drives wheels on both sides of the vehicle.

The driving chain is also suitable for use with conveyor belts in conjunction with driving pulleys as described above.

Although various features of the mechanism described and illustrated will be set forth in the following claims as inventive features, the invention is non necessarily limited to these features and may encompass all inventive features that have been disclosed both individually and in various combinations.

Having disclosed my invention what I claim as new and secure by Letters Patent of the United States is:

1. A torque converter comprising an input shaft connected to an output shaft through a change speed mechanism, said mechanism comprising a first pair of flanges that form a pulley on said input shaft and a second pair of flanges on said output shaft that form a further pulley, at least one flange of each pair being axially displaceable relative to the other flange of said pair, an endless chain being mounted between the flanges of each pair, said chain including relatively movable links and transverse link members which connect said links to form said chain, each said link member having lugs with end faces for engaging said flanges, said end faces being substantially flat and parallel to the surface of the adjoining said flange, hydraulic means displacing said one flange of each pair in relative opposite directions, at least one of said links enclosing a space in which three said link members are located, the portion of each said link member enclosed by said link being symmetrical about a plane approximately perpendicular to the length of said chain.

2. A torque converter as claimed in claim 1, in which, viewed in a sectional plane containing the centerline of the respective shaft, the oppositely facing boundary surfaces of the flanges of each pair open an angle of about 10° to one another.

3. A torque converter as claimed in claim 1, in which at least one of said link members has a non-circular cross-section and substantially symmetrical boundary surfaces on two opposite sides surrounding said end faces.

4. A torque converter as claimed in claim 3, in which the boundary surfaces of the link members are part-cylindrical.

5. A torque converter as claimed in claim 4, in which, as viewed from the side in cross-section, the peripheral dimension of each boundary surface is larger than the peripheral dimension of the other parts of the cross-section.

6. A torque converter as claimed in claim 5, in which the length of each said other part surface, as viewed in cross-section, is about 2.5-times larger than its width.

7. A torque converter as claimed in claim 3, in which two adjacent said links are interconnected by two said link members.

8. A torque converter as claimed in claim 7, in which a said boundary surface of one of the two link members bears on a like said boundary surface of the other link member.

9. A torque converter as claimed in claim 8, in which the internal surface of each said link member facing away from the other said link member bears on an inner surface of one of said two links.

10. A torque converter as claimed in claim 9, in which the inner surface of the respective link fits around a corresponding said internal surface.

11. A torque converter as claimed in claim 3, in which one of the two internal surfaces of each link member terminates with a respective said lug whereby each said link member has two lugs and each said lug extends perpendicular to the lengthwise direction of the link member and parallel to the lengthwise direction of said chain.

12. A torque converter as claimed in claim 11, in which said lug defines each of the two said ends faces of the boundary surface of said link member.

13. A torque converter as claimed in claim 12, in which said lug contacts an outer surface of said link.

14. A torque converter as claimed in claim 11, in which said link members interconnect two groups of said links.

15. A torque converter as claimed in claim 14, in which the two said lugs of each link member embrace outer respective said links of each group of said links which they engage.

16. A torque converter as claimed in claim 15, in which said hydraulic means displaces one said flange of one said pair in a direction opposite to the other displaced flange of the other said pair of flanges.

17. A torque converter as claimed in claim 16, in which the flat surfaces of the lugs of each link member are inclined to one another.

18. A torque converter as claimed in claim 17, in which each flat surface contacts a surface of a said pulley flange of said mechanism.

19. A torque converter as claimed in claim 3, wherein two said link members in said one link are non-contacting and in which the smallest distance between said two non-contacting said link members within a said link, in cross-section, at least equals a dimension measured in the same direction of the engaging surfaces between each said link member and the corresponding said flange which it engages.

20. A torque converter as claimed in claim 19, in which, said link encloses a space and, as viewed perpendicular to the lengthwise direction of a said link, the width of said link is smaller than the largest dimension of the space enclosed by said link.

21. A torque converter as claimed in claim 20, in which the largest dimension of said space is about ten times said width.

22. A torque converter as claimed in claim 3, in which, as viewed from one side, said link has a substantially rectangular shape.

23. A torque converter as claimed in claim 22, in which three sides of said link are slightly curved.

24. A torque converter as claimed in claim 23, in which the curved sides are curved outwardly.

25. A torque converter as claimed in claim 14, in which said link members are composed of ball-bearing steel.

26. A torque converter as claimed in claim 25, in which the links are composed of spring steel.

27. A torque converter comprising an input shaft connected to an output shaft through a change-speed mechanism, said mechanism comprising a first pair of flanges that form a pulley on said input shaft and a second pair of flanges on said output shaft that form a further pulley, at least one flange of each said pair being axially displaceable relative to the other flange of said pair, an endless chain being mounted between the flanges of each said pair, said chain having links connected to one another in the lengthwise direction of the chain by two relatively movable link members, at least one of said links enclosing a space in which at least three link members are located, the portion of each link member enclosed by said links being symmetrical in a plane approximately perpendicular to the length of said chain, hydraulic means displacing said one flange of each said pair of flanges in relatively opposite directions to vary the rotational speed of said output shaft relative to that of said input shaft.

28. A change speed mechanism for a torque converter which includes an input shaft and an output shaft, the change speed mechanism comprising: a first pair of flanges forming a pulley on said input shaft; a second pair of flanges forming a further pulley on said output shaft; an endless chain received around and operative connecting said pulleys; said chain having links connected to one another in the chain's lengthwise direction by two relatively movable link members, at least one of said links enclosing a space in which at least three link members are located, the portion of each link member enclosed by said links being symmetrical about a plane approximately perpendicular to the length of said chain.

* * * * *